July 20, 1965

E. D. BEAUCHAMP ETAL 3,196,255

ELECTRICAL PROPORTIONAL CONTROL SYSTEM

Filed May 29, 1961

INVENTORS:
EDWARD D. BEAUCHAMP,
PAUL A. BENSON,
DONALD S. SAULSON,
BY *Thomas D. Vinter*
Attorney.

July 20, 1965  E. D. BEAUCHAMP ETAL  3,196,255
ELECTRICAL PROPORTIONAL CONTROL SYSTEM
Filed May 29, 1961  3 Sheets-Sheet 2

INVENTORS:
EDWARD D. BEAUCHAMP,
PAUL A. BENSON,
BY  DONALD S. SAULSON,
Thomas D. Vinton Attorney.

United States Patent Office 3,196,255
Patented July 20, 1965

3,196,255
ELECTRICAL PROPORTIONAL CONTROL SYSTEM
Edward D. Beauchamp, Lakewood, and Donald S. Saulson and Paul A. Benson, Torrance, Calif., assignors to The Garrett Corporation, Los Angeles, Calif., a corporation of California
Filed May 29, 1961, Ser. No. 113,387
18 Claims. (Cl. 219—497)

The present invention relates to electrical control systems and more particularly to such systems for automatically regulating the temperature of an entity having specific thermal characteristics, such as an electrically heated windshield.

The need for maintaining an unobstructed view through windshields of various vehicles under weather conditions conducive to the deposit of ice or fog thereon is well known. This need may be manifest on railroad trains, buses, boats or aircraft, particularly under Arctic or high altitude conditions.

A convenient manner of heating the glass windows per se is to pass electric current through a resistive but transparent layer in known fabricated glass panes. Because of the thermal characteristics of glass it will be appreciated that a thermal control system of more than ordinary sophistication is desirable.

Accordingly, our control has electrical circuitry to prevent thermal shock caused by too rapid heating or too rapid cooling of the windows. A power-limiting circuit is also provided to compensate for decreased electrical resistance of the conductive layer caused by thermal aging, thus preventing excessive power dissipation under these conditions.

The control has been designed to operate in a temperature control mode for maintaining the temperature within two elevated temperature limits between which the power consumed by the heating element is inversely proportional to the temperature. This requires only a single temperature sensor, which is imbedded in the window glass.

The control has two distinct operational modes; the warm-up mode and the controlling mode. The warm-up mode employs proportional control such that the heating power increases proportionally with the temperature of the window. The heating power versus the window temperature is a constant regardless of the ambient temperature at the start of heating. Thus, the heating power is programmed to increase slowly in accordance with a ramp function until the temperature has reached the controlling mode. To further insure that the glass is not thermally shocked, time constant circuitry is incorporated in the control apparatus to protect the glass from instantaneous delivery of excessive heating power at the time of closing the "on" switch. The time constant circuit gradually increases the heating power over a time interval of many seconds until this power reaches a value determined by the ambient temperature of the window. The effects of the time constant function and the ramp function may be varied in order to obtain various window temperature versus time characteristics.

During the controlling mode, heating power varying from 100 percent to zero percent of capacity and inversely proportional to the temperature between two elevated limits defining a control range, is delivered to the window.

In addition, provision is made for establishing a first elevated temperature control for accomplishing defogging; and a second elevated temperature where de-icing is accomplished, the selection between the two being made by a control switch.

The above-mentioned functions are performed entirely without mechanical movement within the control apparatus.

This is accomplished by employing magnetic amplifier and silicon controlled rectifier elements in combination with additional fully static circuitry to effect control of electric power without recourse to relay contacts or revolving machinery.

Briefly, we employ a bridge circuit for interpreting window temperature as determined by a resistive sensor therein.

A first stage magnetic amplifier is connected to this bridge. By means of unilateral negative feedback this stage functions at low gain during the warm-up mode. This prevents saturation. The high gain required during the controlling mode is also obtained because of the unilateral nature of the feedback.

A second stage magnetic amplifier, or "firing circuit," changes the directly proportional output of the first stage to an inversely proportional output, thereby decreasing heating power as the error signal increases. This is accomplished by biasing the second stage so that it will have maximum gain in the absence of an output from the first stage. Two separate control windings with diodes in series therewith are employed to decrease the output of the second stage as the output of the first stage increases, either positively or negatively.

A pair of silicon controlled rectifiers connected in opposite polarity are employed as the heating power controls. The second amplifier stage is excited by a square wave of alternating-current of the same frequency as employed for heating power. The firing angle of the second stage in increased; i.e., occurs later in the alternating half-cycle, as this stage is turned off. Applied to the control electrodes of the silicon controlled rectifiers, this delay in actuation decreases the effective heating power.

A power limiting circuit is formed by summing the power supply voltage and a voltage proportional to the heating current, and applying a limiting function upon the second stage of the magnetic amplifier if this exceeds a predetermined magnitude. This circuit consists of a voltage divider across the power supply source, a current transformer in series with the controlled rectifiers, a rectifier in series with these elements to form an envelope of the alternating current and at least one Zener diode to determine a threshold below which this circuit is not effective in the overall control function.

The thermal shock mentioned is avoided by connecting a low pass filter having a long time constant to a separate control winding of the second magnetic amplifier stage. The second stage is normally biased half off by other biasing means. When current through this control winding is passed due to an "on" switch being closed, the second stage is slowly biased to full on. When the switch is turned to "off" the reverse operation occurs.

In order to obtain a longer turn off time constant in one embodiment of the invention a small transistor amplifier is employed to increase the gain in the time constant circuitry so as to accomplish the control function of the magnetic amplifier.

An object of our invention is to provide a static control for an electrical heating system.

Another object is to accomplish complete shut-off of heating power by static power-controlling means.

Another object is to provide a control which prevents thermal shock upon the initiation or upon the cessation of heating.

Another object is to provide a control having means for limiting heating power to a predetermined maximum.

Another object is to provide a control having one mode of operation during the warm-up period of the entity heated and another mode of operation during the cycling control period.

Another object is to provide a control for an electrical heating system which control employs magnetic amplifier and silicon controlled rectifier elements in combination with auxiliary electrical circuitry.

Another object is to provide a static control for an electrical heating system which control employs a transistor amplifier.

Another object is to provide a control for an electrical heating system which control is of relatively long life, reliable and relatively lightweight.

Other objects will become apparent upon reading the following detailed specification and upon examining the accompanying drawings wherein.

Figure 1:
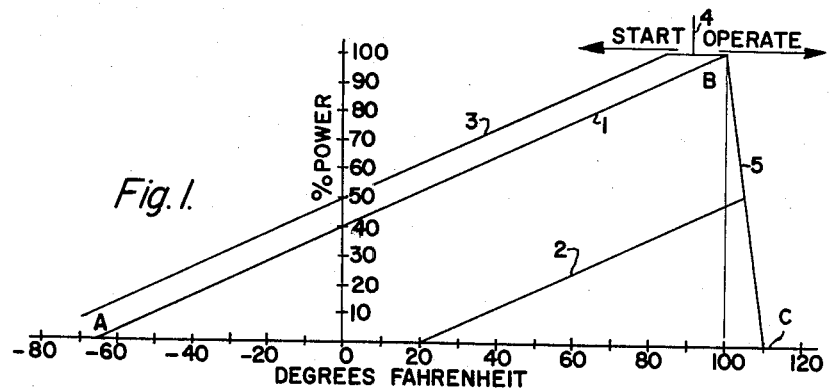
FIGURE 1 is a graph setting forth the relation between the temperature of the entity heated and the percent of maximum electrical power accomplishing this heating.

In FIGURE 1 the abscissa represents the temperature of the entity to be heated such as the windshield window mentioned, as determined at the temperature-sensitive sensor resistor. In the one example given, a minimum ambient temperature of −65° Fahrenheit is contemplated and a maximum warming temperature of 110° Fahrenheit is provided. It will be understood that this temperature range may be altered as desired in various embodiments by employing other control and heating power parameters.

The ordinate represents the percent of full power capability employed at any given window temperature in relation to the equilibrium temperature of the window for particular ambient temperatures.

Curve 1 in FIGURE 1 represents the heating power vs. window temperature for equilibrium at a −65° Fahrenheit ambient temperature. Curve 2 represents the same thing for an ambient temperature of 20° Fahrenheit.

In determining these conditions an ambient temperature of −65° Fahrenheit and turbulent outside air flow were assumed, and it was desired that a window temperature of 100° Fahrenheit be achieved as measured at the sensor with 100 percent delivery of heating power. This determined point B on Curve 1. With zero delivery of heating power the window remains at the ambient temperature, neglecting absorption of external radiation, as from the sun. This condition determined point A on Curve 1. The equilibrium curve of heating power vs. window temperature is linear and passes through both points A and B. Any minor non-linearities, such as due to radiation of heat from the window, have been disregarded.

It will be seen that equilibrium Curves 1 and 2 represent two of a family of such curves, there being one curve possible for each ambient temperature experienced.

Power Curve 3 represents the heating power vs. window temperature function as programmed by our control circuitry. This lies slightly above the worst condition Curve 1 so that the condition of Curve 1 can surely be met.

It will be understood that the above-defined control conditions minimize thermal shock to the window heated, in that at −65° Fahrenheit approximately 10 percent of maximum heating power is applied. As the window warms, the percentage increases until just before the temperature at which warmup ceases and cycling control starts, i.e., 100° Fahrenheit, 100 percent of heating power is applied. Similarly, with the 20° Fahrenheit original temperature for the window the percentage of maximum heating power at the beginning of the control mode is much less i.e., approximately 65 percent.

It will be recognized that the previous considerations have to do with the "start-up" or continuous warming mode of operation of our control apparatus. This mode occurs to the left of the control point 4 in FIGURE 1. To the right of this point the control mode of operation occurs. The relation between temperature of the window and heating power applied during the control mode is given by the steep Curve 5, which extends linearly from 100° Fahrenheit at 100 percent heating power to 0 percent power at 110° Fahrenheit, the latter point being labelled C. When the window temperature decreases to 100° Fahrenheit, the control circuitry acts to increase the temperature by application of the full power capability of the heating facilities. By the time the window temperature reaches 110° Fahrenheit the heating power is zero, and it remains zero for any higher temperatures. Our apparatus can be embodied, of course, for any desired operating point temperature.

In addition to the above-described ramp functions of control we provide an initial time constant circuit which causes the application of heating power to the window to be gradual over a period extending from many seconds to a few minutes. This prevents a sudden surge of heating current when the heating action is started regardless of the ambient temperature. It also causes the heating current to be decreased gradually when the heating action is no longer needed and the control apparatus is deenergized. This functioning will be explained in connection with the explanation of the schematic circuit involved.

Figure 2:
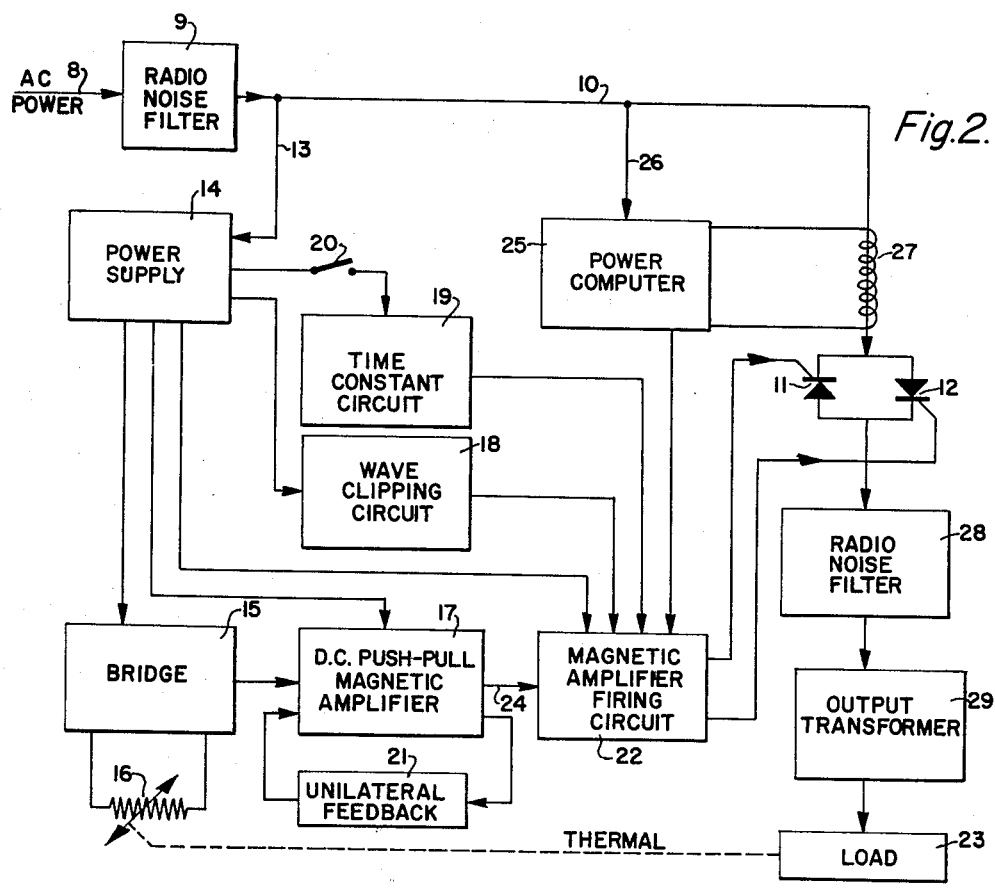
FIGURE 2 is a block diagram representing the interrelationship of the principal components incorporated in an exemplary embodiment of this invention.

In the block diagram of our control circuit of FIGURE 2 alternating electric power is supplied at terminal 8 through a radio noise filter 9 to the remainder of the apparatus. The filter is employed according to present practice to prevent possible low frequency radio frequency interference originating at the controlled rectifiers from passing beyond the control apparatus. Such filters are desirable in vehicles where radio reception is required but filtration is not necessary to the operation of our circuit.

The relatively high-wattage electric power for accomplishing the heating process is conveyed by conductor 10 to controlled rectifiers 11 and 12. A branch circuit 13 conveys power to power supply 14. This power supply furnishes direct current to energize resistive bridge 15, direct current to bias push-pull magnetic amplifier 17, alternating current to operate amplifier 22, alternating current to wave clipping circuit 18 and direct current to time constant circuit 19 through switch 20.

Sensor 16 is located in thermal contact with the substance to be temperature controlled and is temperature-sensitive as to its electrical resistance value. At a preselected control temperature the resistance of the sensor has a value that balances bridge 15. At other temperatures the bridge is unbalanced in either one direction or the other. An instrumentation level of direct current flow from bridge 15 is impressed upon the control windings of push-pull magnetic amplifier 17. This first amplifier stage is provided with unilateral feedback means 21. Degenerative feedback is provided to reduce the gain of stage 17 as long as the temperature of sensor 16 is below the preselected control temperature, and to increase gain when the temperature of the sensor is above the preselected control temperature. This functioning allows unsaturated operation of the first stage of the magnetic amplifier during the warm-up period and sensitive operation of the same for temperature control purposes when the sensor 16 and the entity which it senses has reached the preselected temperature.

Magnetic amplifier firing circiut 22 acts to fire the controlled rectifiers 11 and 12 at a time during each half cycle of alternating current selected to pass the heating power required to obtain the temperature sought in load 23. This load is thermally related to sensor 16, so the control loop is closed.

Magnetic amplifier stage 22 is provided with plural control windings to provide our control with the versatility desirable in a thermal control application of this kind. A suitably amplified direct (pulsating) current passes via conductor 24 from first stage push-pull magnetic amplifier 17 to second stage 22.

Reference has previously been made to means for gradually applying heating power to the temperature-controlled body, and for gradually removing heating power therefrom as well. This is accomplished through the functioning of time constant circuit 19 with switch 20 and power supply 14. The latter provides a direct current which is impressed upon or removed from the time constant circuit at the start and at the cessation of heating operation of the system by closing or opening switch 20, respectively. Time constant circiut 19 is essentially a low filter of long time constant and so applies or removes bias control from magnetic amplifier 22 over a period of the order on one minute.

Reference also has been made to means for limiting the power applied to heat the thermal load. This control is accomplished by power computer 25 providing another bias upon magnetic amplifier firing circuit 22 when the electric power in conductor 10 exceeds a predetermined maximum. The voltage component of the heating power is determined through use of voltage divider 89-90, and by transformer 27 a voltage proportional to the current flowing in conductor 10 is determined. These voltages are summed, rectified and impressed upon at least one avalanche breakdown device, such as a Zener diode. When the power exceeds the predetermined maximum, control current is passed by the Zener diode to decrease the power developed when firing circuit 22 triggers the controlled rectifiers 11 and 12. For power levels less than the predetermined maximum, computer 25 does not affect firing circuit 22; a threshold effect is accomplished.

Square wave alternating current of the same frequency as employed in the rest of the control apparatus is generated in wave clipping circuit 18 from independent transformer sources in power supply 14. This arrangement allows a greater range of phase control to be exercised over the controlled rectifiers 11 and 12 than could be accomplished by employing sine waveshapes. The time of firing of each rectifier during each half cycle of heating current is determined in magnetic amplifier firing circuit 22 by the combined effect of the several biases upon that circuit.

The suitably regulated heating current from controlled rectifiers 11 and 12 passes through radio noise filter 28, which serves the same purpose as the prior filter 9, and then through an output transformer 29 to load 23. The output transformer 29 is employed to match the impedances of the controlled rectifier circuit and the load 23. Where the load 23 is a conductive layer embedded in glass, a step up in impedance may be desirable from rectifiers to the load.

Figure 3:
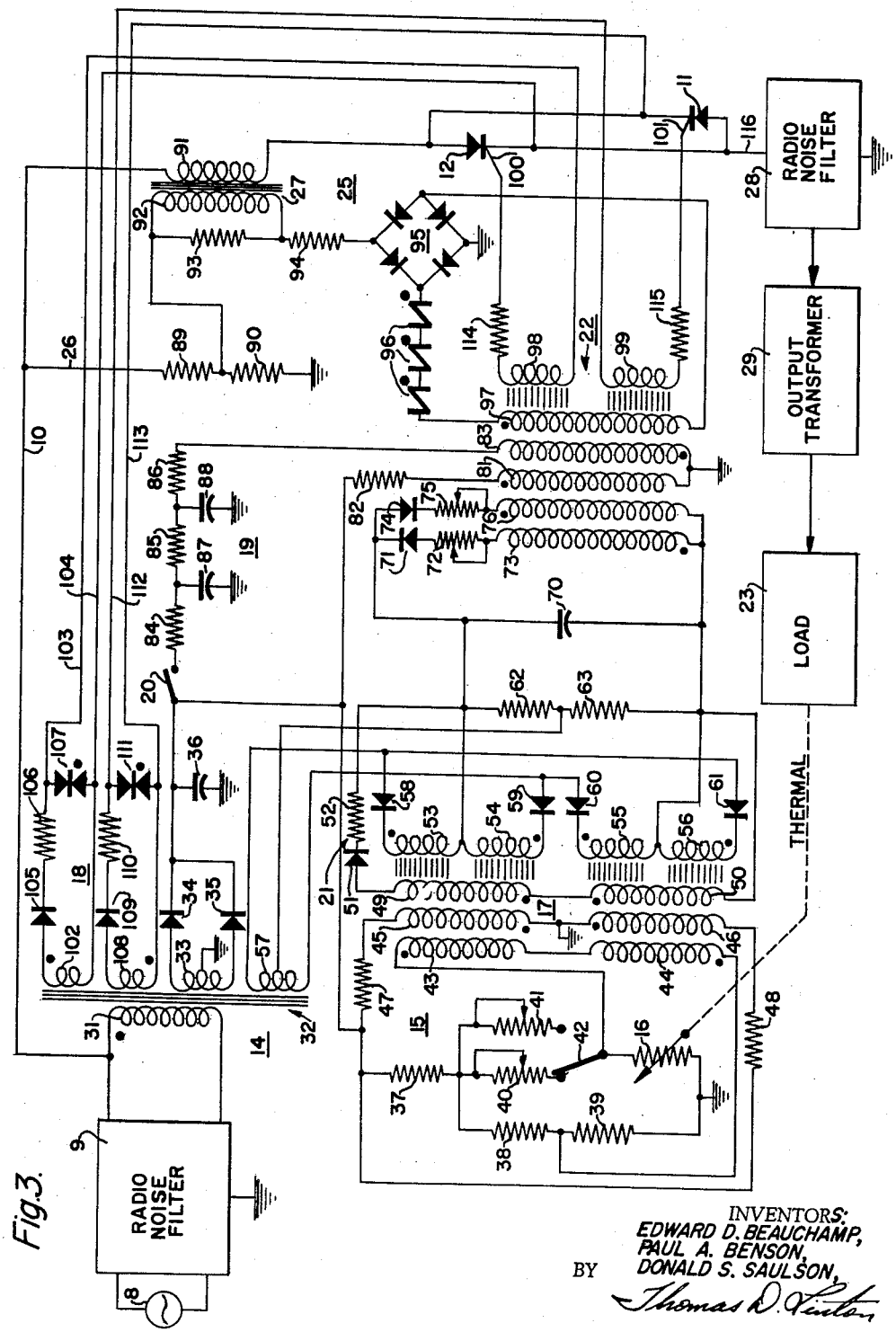
FIGURE 3 is a detailed schematic diagram of a typical embodiment of our control circuit.

The detailed schematic diagram of FIGURE 3 follows the block diagram of FIGURE 2 and the circuit elements of the former and corresponding blocks of the latter are identified by the same reference numerals.

It should be noticed that interconnecting conductors in the block diagram were represented collectively by only a single line whereas in the schematic diagram a separate line represents each conductor.

The alternating power source 8 is conventional, and may have, for example, of 60 cycles per second, 400 cycles per second, etc., and a voltage of 115 volts. The magnetic elements are designed for the particular frequency chosen and the capacitance values are adjusted in inverse relation to the frequency. The apparatus performs satisfactorily under varying conditions and is not "critical" as to values of the components.

Radio noise filter 9 is connected to A.-C. power source 8 and serves to isolate interference. The output thereof connects to primary 31 of power supply transformer 32. This transformed supplies several circuits of the control apparatus. The heating power, often in the kilowatt range, does not pass through transformer 32, but is conveyed directly from the source 8 via conductor 10.

Secondary 33 of transformer 32 is provided with a grounded center tap in order to energize a full wave rectifier circuit which supplies a D.-C. voltage having a magnitude on the order of ten volts. A rectifier 34 is connected to one extremity of secondary 33 and another rectifier 35 to the opposite extremity; which rectifiers may be of the known semiconductor type. The outputs thereof are connected together and to a filter capacitor 36, which may have a capacitance on the order of fifteen microfarads.

The resulting direct current output is employed to energize bridge 15. A connection is made through resistor 37, which resistor has a resistance on the order of five hundred ohms. Resistors 38 and 39, each having a resistance of 125 ohms, complete one arm of the bridge from resistor 37 to ground. The other arm of the bridge consists of a resistor 40 or 41, coupled via selector switch 42 to sensor resistor 16. Resistors 40 and 41 are preferably variable in a practical embodiment, and are set at slightly different resistance values in order to provide thermal control at either of two operating temperatures. For example, resistor 40 might be set at 320 ohms to provide equality of resistance with sensor 16 at 80° Fahrenheit to accomplish a de-fog action, while resistor 41 is set at 340 ohms to provide equality of resistance with sensor 16 at 110° Fahrenheit to accomplish a de-ice action.

Bridge 15 is connected to control windings 43 and 44 of the first stage push-pull magnetic amplifier 17. This connection is opposite to the power connection previously recited; i.e., one lead from the junction between resistors 38 and 39 to winding 44, windings 43 and 44 connected in series and the opposite end of winding 43 connected to the junction between sensor 16 and either resistor 40 or 41 depending upon the position of switch 42. Each of windings 43 and 44 have approximately two thousand turns and are on separate toriodal cores, as, for example, two mil orthonol material, with an outside diameter of the toriods of the order of one inch. The small dots adjacent to coils 43 and 44 at one end indicate the direction of winding, in accordance with usual nomenclature.

Windings 45 and 46 are the bias windings for the push-pull first magnetic amplifier stage. These have fewer turns, of the order of one-hundred fifty each. These are connected in series opposing, grounded at the junction between the two and each connected to a resistor at the opposite extremities of the windings. These resistors, 47 and 48, each have a resistance of the order of twenty-five thousand ohms and both connect to the full-wave rectifier previously described, as at the top of filter capacitor 36.

Similarly symmetrical are feedback windings 49 and 50, which are connected together. Winding 49 is connected to diode 51, which may be of the semiconductor type, and thence to resistor 52, which has a resistance of the order of four hundred ohms.

The output windings 53 and 54 are series connected with a center tap for one half of the push-pull stage, and output windings 55 and 56 are similarly connected for the other half. Exciting power for the gates of this magnetic amplifier is provided by secondary 57 of transformer 32. Diode 58 is connected to one extremity of secondary 57 and to the extremity of output winding 53. Diode 61 is also connected to the same extremity of secondary 57 and to the extremity of output winding 56. The other extremity of secondary 57 is correspondingly connected to diode 59 and that diode to the extremity of output winding 54, and also to diode 60 and that diode to the extremity of output winding 55. All of the diodes are connected in the same polarity.

The center tap between winding 53 and 54 connects to one end of a resistor 62 and the center tap between windings 55 and 56 connects to one end of a resistor 63. The junction between these two resistors connects to the center tap of secondary 57. Resistor 62 connects to resistor 52 of unilateral feedback entity 21, and resistor 63 connects to feedback winding 50. The feedback path is continued from winding 50 through winding 49 and diode 51. Resistors 62 and 63 have equal resistances, of the order of a thousand ohms.

While it will be understood that the exact number of turns on each of the several windings of a magnetic amplifier is subject to variation according to known principles of design, the preferred embodiment of this invention has about one-hundred fifty turns on each of feedback windings 49 and 50, and about twelve-hundred turns on each of windings 53, 54, 55, and 56.

The whole feedback circuit of first stage magnetic amplifier 17 includes elements 49, 50, 51, 52 connected at opposite extremities of resistors 62 and 63. This circuit is made unilateral by diode 51, which, of course, will allow current flow in one direction but will inhibit it in the opposite direction.

Figure 5:
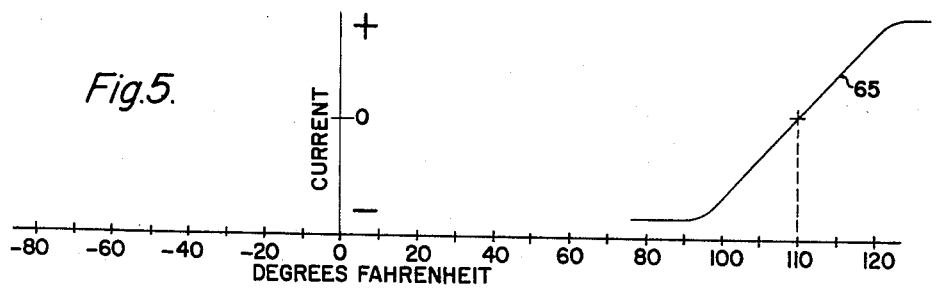
FIGURE 5 represents the current vs. sensor temperature characteristic for a conventional first stage magnetic amplifier.

In FIGURE 5, the output of the first stage magnetic amplifier 17 is shown plotted as a function of the temperature of sensor 16, for the case in which negative unilateral feedback is not applied to this stage. The curve 65 is symmetrical as to output current above and below the equilibrium temperature of 110° Fahrenheit, the temperature at which bridge 15 is balanced with switch 42 in the right hand position and the 110° Fahrenheit resistor 41 in circuit.

Figure 6:
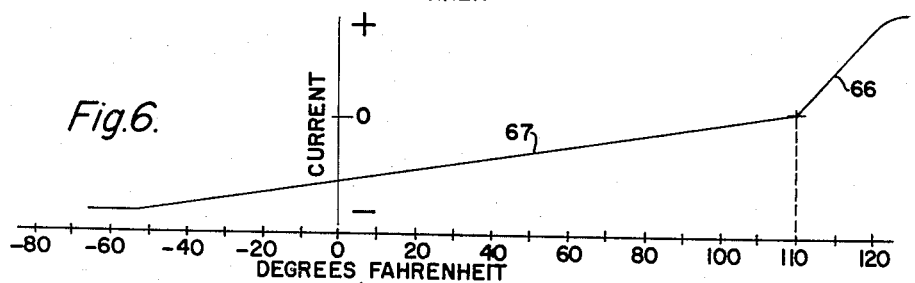
FIGURE 6 is the current vs. sensor temperature characteristic of the first sage of our magnetic amplifier, which stage employs unilateral feedback.

In FIGURE 6, the output of the first stage is shown according to the same parameters with negative unilateral feedback applied. The upper part of the curve 66 is seen to be the same as the upper part of curve 65 of FIGURE 5. However, the lower part thereof 67 has a very gradual slope, signifying negative feedback which has reduced the gain of the stage to a relatively low value. This part of the curve is the one that is effective at low sensor temperatures. Thus, gradual control is effected over a large temperature range in the warm-up mode of operation and sensitive control effected when the preselected equilibrium temperature has been exceeded. In a practical embodiment, this dual sensitivity was expressible as a 100 percent power change for 130 ohms change in sensor resistance during the warm-up mode and 100 percent power change for only 7 ohms change in sensor resistance during the control mode of operation.

Capacitor 70 is connected across the extremities of resistors 62 and 63 and is employed to insure the elimination of high frequency voltages from the control windings of the second stage magnetic amplifier so as to insure proper operation. Capacitor 70 may have a capacitance on the order of five microfarads.

The magnetic amplifier firing circuit 22 is of the self-saturating alternating current type. The output of the first push-pull stage 17 appears across capacitor 70 and is impressed upon both of the two control circuits for the second stage; i.e., diode 71, adjustable resistor 72 and control winding 73; also diode 74 having the opposite polarity of connection with respect to diode 71, adjustable resistor 75 and oppositely-wound control winding 76.

It will be seen that the series circuit through which the output from the first stage magnetic amplifier will flow will depend upon the polarity of that output. The component values of each series circuit are identical save for the resistance values. Resistor 72 has a value of the order of five thousand ohms and resistor 75 of twenty thousand ohms. Each of the windings 73 and 76 have about two thousands turns of wire.

Figure 7:
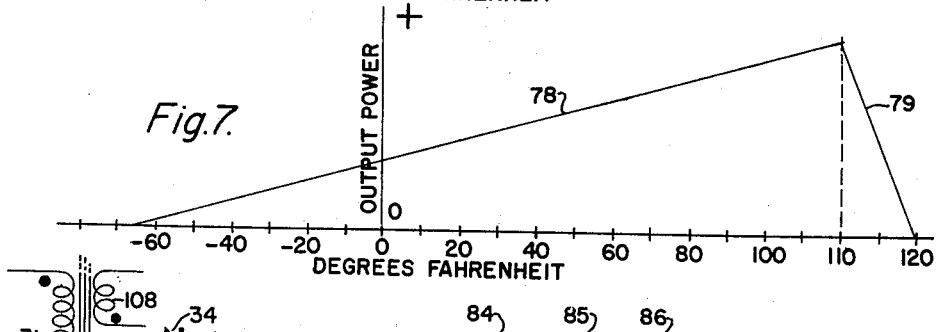
FIGURE 7 is the output power vs. sensor temperature characteristic of the second stage of our magnetic amplifier.

Either polarity of output from the first stage will tend to turn off the second stage. This is shown in FIGURE 7, plotted with output power as a function of the temperature of sensor 16. With 110° Fahrenheit selected as the control temperature it is seen that the output decreases to zero at −65° Fahrenheit rather gradually via linear curve 78 and rather abruptly to zero at +120° Fahrenheit via linear curve 79. It will be recognized that this is a novel mode of functioning.

Bias winding 81 has about thirty turns. The bias circuit includes resistor 82, having a resistance of about 1300 ohms, and suited to limit the current flow through winding 81 the value required for a median working flux. Resistor 82 is connected to the full wave rectifier previously described at filter capacitor 36 as the source of bias current. One end of winding 81 is connected to ground to complete the series circuit.

Another winding, 83, provided upon the cores of the second magnetic amplifier stage, is connected between the time constant circuit 19 and ground for the purpose of accomplishing the slow application and removal of heating power from the load 23. This winding has about two thousand turns.

The low pass electrical filter 19 is comprised of three series resistors 84, 85 and 86, having resistances of thirty, twelve and ten thousand ohms, respectively, and two shunt capacitors 87 and 88, having capacitances of one-hundred fifty and three-hundred microfarads, respectively. The resistor 84 connects to switch 20, and resistor 86 connects to winding 83.

The time constant of filter 19 is about thirty seconds. This is the time interval required for the current flow through the filter to become 63 percent of its ultimate maximum value. A time interval five times as long is required in order to reach substantially 100 percent of the maximum current value, so the gradual increase of current from zero to full value requires a time interval of about two and one-half minutes. This is desired in typical applications of our control circuit, as has been previously explained.

A relay or contactor is not required in our system for energizing and de-energizing the heating power. This is accomplished by static components under the control of switch 20 and including time constant circuit 19.

When the system is energized and switch 20 is closed, the second stage 22 is immediately biased off by current through winding 81 and resistor 82. Winding 83 opposes winding 82 and so as the current slowly builds up through winding 83 the stage 22 is biased to an operating part of its characteristic. When it is desired to cease the heating function switch 20 is opened. In nearly the same period of time as was required for the current through filter 19 to build up the current decays, and so stage 22 again is biased to inoperability although electrical excitation is still applied to both the control and the power heating circuits.

We now turn to the power computer means for limiting the maximum heating power that can be passed in the system. When load 23 is comprised of electrically heated windows this aspect of control system operation is particularly important, not only because of the thermal fragility of the load but because the resistance of these windows may diminish with age.

The voltage from the heating power circuit 10 is applied across voltage divider 89, 90. Resistor 89 of this divider has a resistance of the order of five thousand ohms and resistor 90 a resistance of the order of one thousand ohms. At the junction between the two resistors, therefore, there exists a voltage of about one-sixth the heating power voltage.

The transformer 27 has a primary 91 of relatively few turns in the heating power lead 10 as it passes to controlled rectifiers 11 and 12. Secondary 92 has relatively many turns and provides a voltage across a shunting resistor 93 of the same order as the voltage appearing at the junction between resistors 89 and 90. The resistance of resistor 93 is of the order of two hundred ohms. This resistor is connected to the junction between resistors 89 and 90 and so at the end of resistor 93 away from the junction there exists a voltage above ground that is the sum of the voltage at the junction and the voltage appearing across resistor 93. That is, a voltage proportional to the voltage and the current associated with conductor 10.

This voltage is then passed through resistor 94, having a resistance of thirty thousand ohms, to bridge rectifier 95 and thence to ground to complete the circuit. The four individual rectifiers of the bridge rectifier may be of the usual semiconductor type, such as the 1N462.

At least one, and as shown, three, Zener diodes collectively designated 96 are connected to a junction of bridge rectifier 95 other than the two junctions for which connections have already been specified. The remaining junction of the bridge rectifier is connected to additional bias winding 97 of second stage magnetic amplifier 22, and this winding is also connected to Zener diodes 96 to complete this circuit. Winding 97 has a relatively large number of turns, such as twenty-five hundred.

It will be recognized that an alternating voltage arises within the group of resistors 89, 90, 93, that this is converted to a direct voltage by bridge rectifier 95 and that when the Zener breakdown voltage of Zener diodes 96 is exceeded a current will flow through winding 97. Above the threshold established by the Zener diodes this current is proportional to the power flowing in conductor 10. Winding 97 is wound to oppose an increase in output from second magnetic amplifier stage 22. Thus the power in conductor 10 is subject to a limiting action. A typical threshold voltage for the three series-connected Zener diodes 96 is of the order of thirty volts, and these may of the 1N757 type.

In view of the prior description of stage 22 it will be seen that a magnetic flux, controlled as to several parameters, exists in the cores of this stage and affects output windings 98 and 99. The purpose of this stage is to control the phase angle of the firing trigger energy applied to control electrodes 100 and 101 of controlled rectifiers 12 and 11.

The second amplifier stage is excited by a square wave shape of alternating current, as has been mentioned. This energy for winding 98 is provided by the elements associated with secondary 102 of transformer 32 as will be noted by tracing conductors 103 and 104. Diode 105, connected to one terminal of secondary 102, is the reset diode for the magnetic amplifier. Resistor 106, connected back-to-back. The other side of the double Zener ohms. It connects to one side of a double Zener diode 107, which consists of two individual Zener diodes connected back-to-back. The other side of the double Zener diode is connected to the remaining terminal of secondary 102 and conductor 104. The double Zener diode forms square waves of the half-cycles of alternating current passed by diode 105 which originated in secondary 102.

A companion exciting means for output winding 99 is comprised of additional secondary 108 of transformer 32, diode 109, resistor 110, double Zener diode 111, conductor 112 and conductor 113.

The circuit of winding 98 is completed to control electrode 100 of controlled rectifier 12 through a limiting resistor 114, having a resistance of the order of fifteen ohms. The circiut of winding 99 is likewise completed through equivalent resistor 115. Resistors 114 and 115 protect the controlled rectifiers and also insure proper firing thereof.

Controlled rectifiers 11 and 12 are "silicon controlled rectifiers," and are widely available in various power-handling capabilities extending into the killowatts of power. Types WX809F or ZJ-50-300 are suitable in the subject embodiment for handling heating power measured in the few kilowatt range. Other controlled rectifiers of larger power-handling capabilities can also be controlled by the control circuitry described, and the power rating of the system can be increased to several times greater than the range mentioned.

The distinguishing characteristic of the controlled rectifier is that it will not pass current until it is "fired" by a current supplied to its control electrode. This is a relatively small current, in the milliampere range for the control of power currents in the many ampere range. It will be seen that if the phase of this control current is altered with respect to alternating current heating power utilized in the system, the power actually passed for heating can be conveniently varied. If the control current is supplied at the beginning of each half-wave of alternating current heating energy the full heating capacity of the system will be realized. If the control current is supplied at the end of each half-wave of alternating current heating energy the heating will be zero. A smooth and effective control is thus provided for varying the heating energy by varying the phase of the control current with respect to the heating alternating current electrical energy. It is seen how the several controls of the second or "firing circuit" magnetic amplifier stage provide this phase control upon the current in the output windings 98 and 99 in the apparatus detailed in FIGURE 3. The magnitude of the input controls the reset action of the magnetic cores. This results in variable storage capability of the cores and proportionally delays the trigger signal that is applied to the controlled rectifiers.

It will further be seen that the square wave-shape excitation of the output windings 98 and 99 allows the broadest range of control over the controlled rectifiers. This is because a certain amplitude of voltage is required to "fire" any controlled rectifier and a somewhat greater voltage will burn-out a controlled rectifier. The usual sine wave-shape has a maximum value that is flanked by reduced values upon each side of the maximum. The maximum value of the sine wave-shape must not exceed the burn-out voltage of the rectifiers. Thus the necessary amplitude to fire the rectifiers is reached relatively near the maximum value when considered as a matter of phase, and control is not afforded at near zero nor near 180° phase values.

In contrast, the maximum value of a square wave-shape persists for essentially the full direction of the half-wave involved. This value is arranged to be greater than the value required for firing the controlled rectifiers but less than the value at which these would be damaged, thus providing a particularly satisfactory control according to the requirements of our invention.

In FIGURE 3 it will be noted that controlled rectifier 11 is connected in opposite polarity to controlled rectifier 12. This allows full wave passage of heating energy, for one polarity of the alternating current from conductor 10 may pass through controlled rectifier 11, and the opposite polarity may pass through controlled rectifier 12.

The current thus passed flows in conductor 116 and through radio noise filter 28, which has been previously described. The second, or return, conductor of the heating circuit is completed through ground from radio noise filter 9. Output transformer 29 and load 23 were previously described in connection with FIGURE 2, as well as the thermal relation between the load and sensor 16. It will be understood that the impedance ratio of transformer 29 may be either step up or step down in order to effect the most efficient transfer of power from terminals 8 of FIGURE 3 to the impedance of the particular load.

The radio noise filters 9 and 28 are not an essential part of our apparatus but are often desirable, as has been stated. Suitable filters may be formed by connecting three inductors (not shown) having wire sufficiently large to carry the several amperes of heating current in series. These may have an inductance of the order of thirty microhenries each. Three capacitors are connected in shunt to ground from the junction between the connection of each inductor to the next. The filter is connected to have a capacitative input; i.e., one capacitor shunts the input. Each capacitor may have a capacitance of a half-microfarad.

When manufactured as shown and described in connection with FIGURE 3, the control apparatus is essentially self-calibrated, particularly as to overload functioning. The exact temperature calibration is performed by adjusting variable resistors 40 and 41. Variable resistors 72 and 75 at the input to the firing stage 22 further affect the calibration and, particularly, make it possible to establish proper functioning of the magnetic amplifier.

It will be recognized that the magnetic amplifier aspect of our invention provides the advantages of simple and rugged direct current amplification with low impedance input circuits that are not influenced by radio frequency interference created externally to the control apparatus. Consequently, shielding of the conductor from sensor 16 to control windings 43 and 44 are not required, such as would be required for this input to a vacuum tube amplifier.

The electrical efficiency of the control circuitry is believed to be desirably high; 96.5 percent in a representative embodiment. The efficiency of the transformer 29 and of the radio noise filters 9 and 29 is normally somewhat less, depending upon the limitations of size and weight imposed upon them. Such efficiencies may lie in the range of from 85 to 95 percent, causing the whole apparatus employing them to have an efficiency of from 82 to 92 percent, approximately.

Figure 4:
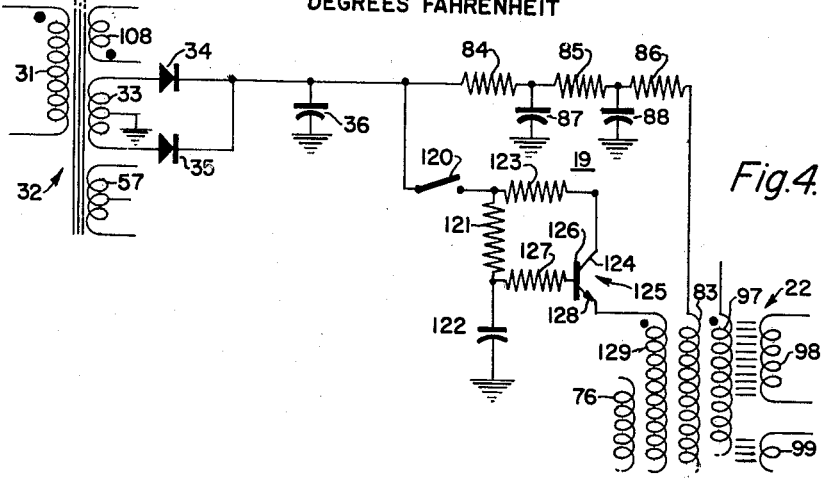
FIGURE 4 is a fragmentary schematic diagram of an alternate embodiment of our control circuit.

FIGURE 4 is a fragmentary schematic diagram of an alternate embodiment of our invention in which the period during which heating power is gradually removed from the load is considerably longer than the period during which heating power is gradually applied to the load.

FIGURE 4 closely corresponds to FIGURE 3. Certain elements shown in FIGURE 3 are shown in their same positions in FIGURE 4 and have the same reference numerals. All other elements of FIGURE 3 have not been altered in forming the circuit of FIGURE 4.

The full-wave rectifier associated with secondary 33 of transformer 32, and the low pass filter 19 are the same as described above with reference to FIG. 3. The latter is connected to winding 83 on the second magnetic amplifier stage, as before.

However, the new circuitry has a switch 120, which is employed instead of the prior switch 20. This switch is manipulated oppositely to switch 20. Switch 120 is open during operation of the system and is closed when it is desired to cease operation. This completes a connection between the direct current power supply and a very long time constant circuit consisting of resistor 121 and capacitor 122, which are connected in series to ground from the switch 120. Resistor 121 has a resistance of the order of one megohm and capacitor 122 a capacitance of one thousand microfarads.

Resistor 123 connects from switch 120 to the collector 124 of a transistor 125. The resistance of resistor 123 is of the order of five thousand ohms and the transistor may be of the 2N333 type. The collector is thus energized from the power supply through resistor 123. The base 126 of the transistor is connected to the junction between resistor 121 and capacitor 122 through resistor 127, which latter has a resistance of the order of one-hundred thousand ohms. The emitter 128 of transistor 125 is connected to winding 129 of second magnetic amplifier stage 22 and the other extremity of the winding is connected to ground to complete the circuit.

In the circuit recited the high resistance employed to achieve the long time constant would not allow sufficient current to flow through winding 129 for control of the magnetic amplifier if the resistor and winding were to be connected together. However, transistor 125 acts as a very much lower impedance source to the winding, and this impedance is varied by the voltage impressed upon the base electrode 126 of the transistor from the long time constant circuit 121, 122. The action of the unilateral feedback circuitry 21 previously described, causes the output heating power to be decreased according to a hyperbolic function with respect to time when switch 120 is closed. With this arrangement the decrease of power can be extended to a time interval of the order of ten minutes.

By comparing FIGURES 3 and 4 it will be noted that bias winding 81 and accompanying resistor 82 have been omitted from FIGURE 4. Proper control of the second magnetic amplifier stage can nevertheless be obtained by lowering the exciting voltage on the gate in FIGURE 4 with respect to that employed in FIGURE 3. That is, the amplitude of the square waves feeding the output windings (98 and 99 in FIGURE 3) is reduced for the circuitry of FIGURE 4 in comparison to the value employed in FIGURE 3. If desired, however, an additional winding equivalent to winding 81 and the prior connection through resistor 82 to the direct current power supply may be employed as an understandable alternate of FIGURE 4, in which the full amplitude of square waves is employed.

From the teaching of FIGURE 4 it is seen that another transistor amplifier could be employed in connection with the warm-up time constant circuit 19 should a long time interval be desired for this function as well.

In the application of our control apparatus to thermal systems it will be understood that almost any equilibrium temperatures may be chosen. Furthermore, it is not necessary that temperature be the parameter sensed and controlled. The parameter may be any that can be sensed by a transducer capable of giving an electrical output, and can be controlled by the direct or indirect application of electrical energy. In any application, the state of the sensor is the condition that determines the status of the system as regards the parameter sensed.

It will be understood that the known grid controlled thyratrons may be employed in our apparatus rather than the silicon controlled rectifiers, in that similar control of power energy is afforded. Further, vacuum tubes per se may also be so employed where relatively large powers are not to be controlled and where the process of control is different, but of the same nature.

While square-wave shapes have been employed in basic embodiments for reasons of balance of controlled output, it will be realized that unbalanced delivery of controlled power can be accomplished by employing rectangular wave-shapes in which the duration of one half of the alternating wave form is less than the duration of the other half.

Although specific examples of voltages, currents and values for the several circuit elements have been given in this specification to illustrate the invention, it will be understood that these are by way of example only and that reasonably wide departures can be taken therefrom without departing from the inventive concept.

Other modifications of the circuit elements, details of circuit connections and alteration of the coactive relation between elements may also be taken under the invention.

We claim:

1. Control apparatus for an electrical heating system comprising: an electrical temperature-sensitive sensor; an electrical circuit including said sensor; a first magnetic amplifier stage having unilateral feedback, said first amplifier stage connected to said electrical circuit and coactive therewith to have low gain when the temperature of said sensor is below a preselected temperature determined by the electrical characteristics of said circuit and to have high gain when the temperature of said sensor is above said preselected temperature; a second magnetic amplifier stage having control windings, said first magnetic amplifier stage connected to said control windings so as to determined the time of firing of said second magnetic amplifier stage so that for no output from said first magnetic amplifier stage the firing is early in the alternating power cycle and for full output from said first magnetic amplifier stage the firing is late; plural controlled rectifiers connected in opposite polarity and having control elements connected to said second magnetic amplifier stage, said controlled rectifiers energized to pass electrical heating energy according to the temperature condition of said sensor as compared with the said preselected temperature; voltage- and current-sensitive means connected to said controlled rectifiers and to said second magnetic amplifier stage through threshold means for limiting said electrical heating energy; time-constant means for exercising a control over said second magnetic amplifier stage; and means for charging said time-constant means so as to limit the rapidity with which electrical heating energy is increased by said rectifiers when said control apparatus is energized and also for limiting the rapidity with which electrical heating energy is decreased by said rectifiers when said control apparatus is de-energized.

2. Control apparatus for an electrical heating system comprising: a resistive temperature-sensitive sensor; a bridge circuit including said sensor; a push-pull magnetic amplifier having unilateral feedback, said push-pull amplifier connected to said bridge circuit and coactive therewith so as to have low gain when the temperature of said sensor is below a preselected temperature determined by the balance of said bridge circuit and to have a high gain when the temperature of said sensor is above said preselected temperature; a magnetic amplifier firing circuit having control windings, said push-pull amplifier connected to said control windings for determining successive times of firing of said firing circuit such that for no output from said push-pull amplifier the firing is early in successive alternating power cycles and for full output from said push-pull amplifier the firing is late; plural oppositely-poled controlled rectifiers having control elements connected to said firing circuit, said controlled rectifiers energized to pass electrical heating energy according to the relation of the temperature of said sensor to said preselected temperature; voltage- and current-sensitive means connected to the circuit of said controlled rectifiers, said voltage- and current-sensitive means also connected to said firing circuit through a Zener diode to limit said electrical heating energy to a preselected maximum value; a low pass filter having a long time constant connected to exercise a control over said firing circuit; and means to charge said filter connectable thereto by a switch to limit the rapidity with which electrical heating energy is increased by said rectifiers upon said control apparatus being energized and also to limit the rapidity with which electrical heating energy is decreased by said rectifiers upon said control apparatus being de-energized.

3. In an alternating current electrical heating system having temperature-sensitive means for altering the time interval during which electrical heating occurs for each cycle of said alternating current, apparatus for limiting maximum heating power utilized in said system, said apparatus comprising:
means for forming a first amplitude of electrical energy proportional to the voltage component of electrical heating power utilized in said system;
means for forming a second amplitude of electrical energy proportional to the current component of electric heating power utilized in said system;
means for adding said first and second amplitudes to produce a power-representative signal;
means coupled to the adding means for rectifying the power-representative signal to produce a power-control signal;
means responsive to the power-control signal for controlling heating power utilized in said system;
and a Zener-type diode connected between said rectifying means and said controlling means for disconnecting the former from the latter when the power-control signal is less than the reverse-voltage breakdown potential of the said Zener-type diode, and for interconnecting the rectifying and controlling means when the power-control signal exceeds the reverse-voltage breakdown potential.

4. A control system for minimizing bilaterally-variable deviations of a variable parameter of a physical phenomenon from a predetermined standard, and characterized by a more rapid response to deviations in one direction than the other, the said system comprising:
first means for producing an electrical signal representing the parameter to be controlled;
second means for producing an electrical signal representing the predetermined standard;
means coupled to the first and second means and responsive to the parameter and standard signals for developing an error signal having a polarity representing the direction and a magnitude representing the extent of deviation of the parameter signal from the standard signal;
means responsive to electrical energy for controlling the parameter;
means coupled to the controlling means and including at least one on-off electrical switching device having a switching-control element for supplying electrical energy to the controlling means;
and means coupled to the developing means and the switching-control element for operating the switching device through time-spaced on-off cycles of operation having respective time durations varying directly in response to changes in the error signal, the operating means further including
a push-pull magnetic amplifier having a unidirectionally-conductive degenerative feedback circuit for producing a first output signal of a first polarity and amplitude in response to a first error signal of one polarity and magnitude, and a second output signal of second polarity and lower magnitude than the first output signal in response to a second error signal equal to the first error signal in magnitude but opposite in polarity.

5. In a temperature control system for minimizing temperature fluctuations in a thermally-sensitive body from a predetermined reference temperature under conditions of wide ambient temperature variations below the reference temperature, and including means responsive to electrical energy for heating the body to the reference temperature, means in thermal-relation to the body for producing an electrical signal representing the direction and amplitude of deviations of body temperature from the reference temperature, and means for regulating the flow of electrical heating power coupled to the heating means, the regulating means including a magnetic amplifier having a first control winding coupled effectively to the producing means, and a second control winding; apparatus for safeguarding the body from the deleterious effects of sudden heating and cooling, said apparatus comprising:
an electrical integrator coupled to the second control winding;
and means coupled to the electrical integrator for connecting and disconnecting the latter from a source of unidirectional current, so that the effective gain of the magnetic amplifier will increase gradually to a design limit throughout a time interval of predetermined duration when direct current is connected to the integrator, and decrease gradually to zero through a second predetermined time interval when direct current is disconnected from the integrator.

6. In a temperature control system for minimizing temperature fluctuations in a thermally-sensitive body from a predetermined reference temperature under conditions of wide ambient temperature variations below the reference temperature, and including means responsive to electrical energy for heating the body to the reference temperature, means in thermal-relation to the body for producing an electrical signal representing the direction and amplitude of deviations of body temperature from the reference temperature, and means for regulating the flow of electrical heating power coupled to the heating means, the regulating means including a magnetic amplifier having a first control winding coupled effectively to the producing means, and a second control winding; apparatus for safeguarding the body from the deleterious effects of sudden heating and cooling, the said apparatus comprising:

a first electrical integrator coupled to the second control winding; for increasing the gain of the magnetic amplifier gradually throughout a first time interval;

a transistor amplifier having an input element, and an output element coupled to the third control winding;

a second electrical integrator having an output junction coupled to the input element of the transistor amplifier and a time constant substantially longer than the time constant of the first integrator;

and means for applying direct current power simultaneously to the transistor amplifier and the second electrical integrator so that the effective gain of the magnetic amplifier will diminish gradually to zero throughout a second time interval substantially longer than the first time interval.

7. In an electrically-controlled heating system utilizing a magnetic amplifier having plural control windings to effect proportional control over electric power supplied to a heating unit, apparatus for effecting a gradual increase in the heating power throughout a first time interval beginning when the system is actuated, and to diminish heating energy effectively to zero throughout a second time interval beginning when the system is de-actuated, said apparatus comprising:

a plural section low pass filter coupled to one of said plural control windings;

means for applying undirectional electrical power to the said filter in order to develop a gradually increasing voltage for the control of heating energy during the charging period of the filter;

a switch for controlling actuation and de-actuation of the heating system;

a first resistor and a capacitor, said first resistor and said capacitor having a longer time constant time than the charging period of said low pass filter, and connected in series with said switch across the electric-power applying means;

second and third resistors;

a transistor having a base coupled via the said second transistor to a junction between said first resistor and said capacitor, a collector coupled via said third resistor to a junction between said first resistor and said system control switch, and an emitter connected to another one of said plural control windings, whereby heating energy supplied to the heating unit gradually will be diminished effectively to zero throughout a predetermined time interval beginning upon de-actuation of the system by operation of said switch.

8. In a control system including means responsive to electrical energy for controlling a physical condition, apparatus for maintaining a predetermined state of the condition by regulating the supply of electrical energy to the controlling means, the regulating apparatus comprising:

first means for producing an electrical condition signal having a magnitude representing the instantaneous state of the condition;

second means for producing a reference signal;

means coupled to the first and second means for developing an electrical error signal having a polarity representing the direction and a magnitude representing the extent of deviation of the condition signal from the reference signal;

means coupled to the controlling means and including a semiconductor switch having a control element, for supplying electrical energy to the controlling means;

and means coupled to the switch control element and developing means for operating the semiconductor switch to regulate the supply of electrical energy to the controlling means, the operating means including an amplifier having a first gain characteristic in response to error signals of one polarity, and a second gain characteristic in response to error signals of the other polarity.

9. In a control system including means responsive to electrical energy for controlling a physical condition, apparatus for establishing and maintaining a predetermined state of the condition by regulating the supply of electrical energy to the controlling means, the regulating apparatus comprising:

first means for producing an electrical condition signal having a magnitude representing the instantaneous state of the condition;

second means for producing a reference signal;

means coupled to the first and second means for developing an electrical error signal having a polarity representing the direction and a magnitude representing the extent of deviation of the condition signal from the reference signal;

means coupled to the controlling means and including a semiconductor switch having a control element, for supplying periodic electrical energy to the controlling means;

and means coupled to the developing means for operating the semiconductor switch to regulate the supply of electrical energy to the controlling means, the operating means including an amplifier having a first gain characteristic in response to error signals of one polarity and a second gain characteristic in response to error signals of the other polarity, and further means coupled to the switch-control element and the amplifier for generating switch-closing pulses at times during the periods of periodic electrical energy determined by the output of the amplifier.

10. In a control system including means responsive to electrical energy for controlling a physical condition, apparatus for establishing, maintaining, and terminating a predetermined state of the condition by regulating the supply of electrical energy to the controlling means, the regulating apparatus comprising:

first means for producing an electrical condition signal having a magnitude representing the instantaneous state of the condition;

second means for producing a reference signal representing the predetermined state of the condition;

means coupled to the first and second means for developing an electrical error signal having a polarity representing the direction and a magnitude representing the extent of deviation of the condition signal from the reference signal;

means coupled to the controlling means and including a semiconductor switch having a control element, for supplying periodic electrical energy to the controlling means;

means coupled to the switch control element and the developing means for generating a switch-operating pulse at a time determined by the error signal during each of the predetermined periods of the periodic electrical energy;

means for energizing and de-energizing selectively the generating means;

and means coupled to the generating means and to the energizing and de-energizing means for shifting the effective phase of the switch-closing pulses in one direction relative to the periodic electrical energy in accordance with a predetermined function when the generating means is energized by the energizing and de-energizing means, and in the opposite direction in accordance with the predetermined function when the generating means is de-energizing by the energizing and de-energizing means.

11. In a temperature control system for minimizing temperature fluctuations in a thermally-sensitive body from a predetermined reference temperature under conditions of wide ambient temperature variations below the reference temperature, and including means responsive to electrical energy for heating the body to the reference temperature, means in thermal-relation to the body for producing an electrical signal representing the direction and amplitude of deviations of body temperature from the reference temperature, and means coupled between the heating means and the producing means for regulating the flow of electrical energy to the former in response to the electrical signal produced by the latter, and including further means for actuating and de-actuating the control system, apparatus for safeguarding the body from the deleterious effects of thermal shock, the said apparatus comprising:

means for developing a control current of continuously changing magnitude in one direction throughout a first predetermined time interval of at least a few seconds duration beginning when the actuating and de-actuating means is actuated, and of continuously changing magnitude in the opposite direction throughout a second predetermined time interval of at least a few seconds duration beginning upon de-actuation of the actuating and de-actuating means;

and means coupled to the developing means and the regulating means for increasing the response of the latter to the electrical signal in accordance with the changing magnitude of control current in one direction, and decreasing the response of the latter means in accordance with the changing magnitude of control current in the opposite direction.

12. In an electrical control system having means for controlling a physical condition, and further means for sensing electrically the deviation of the actual condition from a preselected reference condition in order to produce an error signal, apparatus for controlling the electrical energy utilized in said system for controlling the condition, the apparatus comprising:

a pair of controllable solid-state rectifiers provided with respective control electrodes, and having the anode of one of the rectifiers and the cathode of the other coupled effectively to the condition controlling means;

means for supplying alternating electrical energy to the cathode of the one and anode of the other rectifier to provide controllable electrical heating power for use in the system;

means coupled effectively to the supplying means for developing first and second alternating control signals of mutually inverse phase relation and square waveform, and having a frequency equal to the frequency of the alternating energy applied to the rectifiers;

and a magnetic amplifier having at least one control winding coupled to the sensing means, and output windings coupled respectively between the developing means and the control electrodes of the rectifiers, so that one of the respective leading edges of the control signals may occur and initiate conduction at a time in each successive half cycle of the alternating electrical energy determined by the error signal.

13. In a control system including means responsive to electrical energy for controlling a physical condition, apparatus for establishing and maintaining a predetermined state of the condition by regulating the supply of electrical energy to the controlling means, the regulating apparatus comprising:

first means for producing an electrical condition signal having a magnitude representing the condition of the phenomenon to be controlled;

second means for producing a reference signal;

means coupled to the first and second means for developing an electrical error signal having a polarity representing the direction and a magnitude representing the extent of deviation of the condition signal from the reference signal;

means coupled to the controlling means and including a semiconductor switch having a control element for supplying periodic electrical energy to the controlling means;

and means coupled to the switch control element and the developing means for generating a switch-closing pulse at a time determined by the error signal relative to each of predetermined periods of periodic electrical energy, the last mentioned means including a magnetic amplifier having a unidirectionally-conductive degenerative feedback circuit for reducing the effective gain of the magnetic amplifier whenever the error signal is of a predetermined polarity.

14. A control system as represented in claim 13 wherein the supplying means further comprises means coupled to the magnetic amplifier for maintaining the electrical energy below a predetermined power level less than the maximum power capability of the supplying means.

15. In a control system including means responsive to electrical energy for controlling a physical condition, apparatus for maintaining a predetermined state of the condition by regulating the supply of electrical energy to the controlling means, the regulating apparatus comprising:

first means for producing an electrial condition signal having a magnitude representing the instantaneous state of the condition;

second means for producing a reference signal;

means coupled to the first and second means for developing an electrical error signal having a polarity representing the direction and a magnitude representing the extent of deviation of the condition signal from the reference signal;

means coupled to the controlling means and including at least one semiconductor switch having a control element for supplying periodic electrical energy to the controlling means;

and means including a magnetic amplifier having a push-pull input stage, and an output stage coupled to the switch control element and the developing means for generating a switch-closing pulse having a substantially-vertical leading edge at a time determined by the error signal relative to each of predetermined periods of the periodic electrical energy.

16. A control system as represented in claim 15 wherein the push-pull input stage of the magnetic amplifier comprises:

a first control winding coupled to the error-signal developing means, a second control winding, output windings coupled to the output stage of the magnetic amplifier, and a unidirectionally-conductive degenerative feedback circuit coupled between the output windings and the second control windings for producing a first output signal of a first polarity and amplitude in response to a first error signal of one polarity and magnitude, and a second output signal of second polarity and lower magnitude than the first output signal in response to a second error signal equal to the first error signal in magnitude but opposite in polarity.

17. The control system represented in claim 16 wherein the output stage of the magnetic amplifier further comprises:

at least one output winding coupled to the control element of the at least one semiconductor switch, first and second oppositely-wound input-signal control windings, and first and second gain-control windings;

means coupled to the output windings of the push-pull stage of the magnetic amplifier and to the first and second input-signal control windings of the magnetic-amplifier output stage for conducting selectively the first output signal to one of the input-signal control windings, and the second output signal to the other input-signal control winding;

means for energizing and de-energizing selectively the output stage of the magnetic amplifier;

means for producing and applying an alternating electrical signal of square waveform to at least one output winding of the output magnetic-amplifier stage in order to provide periodic switch-operating pulses having a frequency equal to the frequency of the periodic electrical energy from the supplying means;

and means coupled to the energizing and de-energizing means and to the first and second gain-control windings for shifting the effective phase of the switch-operating pulses in one direction relative to the periodic electrical energy in accordance with a predetermined function when the energizing and de-energizing means energizes the developing means, and in the opposite direction in accordance with the predetermined function when the developing means is de-energized.

18. In a control system including means responsive to electrical energy for controlling a physical condition, apparatus for establishing and maintaining a predetermined state of the condition by regulating the supply of electrical energy to the controlling means, the regulating apparatus comprising:

first means for producing an electrical condition signal having a magnitude representing the instantaneous state of the condition;

second means for producing a reference signal;

means coupled to the first and second means for developing an electrical error signal having a polarity representing the direction and a magnitude representing the extent of deviation of the condition signal from the reference signal;

means coupled to the controlling means and including a semiconductor switch having a control element, for supplying periodic electrical energy to the controlling means;

and means coupled to the switch control element and including a magnetic amplifier coupled to the developing means for generating a square-wave, switch-closing control signal having a leading edge occurring at times during the periods of periodic electrical energy determined by the error signal.

References Cited by the Examiner

UNITED STATES PATENTS

| | | | |
|---|---|---|---|
| 2,341,526 | 2/44 | Breitenstein | 323—66 |
| 2,752,473 | 6/56 | Hage | 219—497 |
| 2,787,696 | 4/57 | Karp et al. | 219—203 |
| 2,872,556 | 2/59 | Obermaier | 219—499 |
| 2,987,666 | 6/61 | Manteuffel | 323—58 |
| 3,036,188 | 5/62 | Ditto | 219—492 |
| 3,047,647 | 7/62 | Harkins et al. | 330—8 |
| 3,076,924 | 2/63 | Manteuffel | 323—76 |
| 3,109,910 | 11/63 | Fogleman | 219—209 |
| 3,114,025 | 12/63 | Blauvelt et al. | 219—494 |
| 3,129,381 | 4/64 | Manteuffel | 323—76 |
| 3,136,877 | 6/64 | Heller | 219—499 |
| 3,149,224 | 9/64 | Horne | 219—501 |

RICHARD M. WOOD, *Primary Examiner.*

ANTHONY BARTIS, *Examiner.*

UNITED STATES PATENT OFFICE
CERTIFICATE OF CORRECTION

Patent No. 3,196,255                                                           July 20, 19

Edward D. Beauchamp et al.

It is hereby certified that error appears in the above numbered patent requiring correction and that the said Letters Patent should read as corrected below.

Column 5, line 25, before "filter" insert -- pass --; column 9, line 52, strike out "back-to-back. The other side of the double Zener" and insert instead -- to the diode, has a low value, of about twenty --; line 74, for "ZJ-50-300" read -- ZJ-50B-300 --; column 13, line 1, for "determined" read -- determine --.

Signed and sealed this 8th day of February 1966.

(SEAL)
Attest:

ERNEST W. SWIDER                                        EDWARD J. BRENNER
Attesting Officer                                                   Commissioner of Patents